Patented May 9, 1944

2,348,484

UNITED STATES PATENT OFFICE 2,348,484

METHOD OF SEALING OFF POROUS FORMATIONS

Howard C. Lawton, Berkeley, Calif., assignor to Shell Development Company, San Francisco, Calif., a corporation of Delaware No Drawing. Application October 31, 1941, Serial No. 417,271

6 Claims. (Cl. 166—22)

The present invention relates to methods of impermeabilizing porous formations and pertains more particularly to methods of shutting off water in oil wells.

Heretofore it has been proposed to seal off porous formations with various materials, such as cement or clay suspensions, solutions of silicates, gum arabic, alginates and other precipitate-forming chemicals. However, the plug formed by these impregnating agents has been unsatisfactory for one reason or another. These agents, however, form plugs that are difficult to place or to control, or have insufficient strength to prevent expulsion from the formation by the tectonic pressures, or are insufficiently permanent due to disintegration or dissolution by natural or other extraneous liquids. Thus, in many cases it is desirable to plug watered-out sands which contain residual oil. Although in most cases the previous plugging materials will set or form solids in the presence of oil, they are weakened by the oil or are dissolved or eroded away by the continued flow of water or brine, thereby preventing a suitable shut-off of water.

It is therefore an object of this invention to provide a method of sealing off porous formations in oil wells, whereby there is formed a plug of a material which hardens and becomes increasingly less soluble and less susceptible to disintegration during the life of the well.

It is a further object of this invention to provide a shut-off method, wherein a plug may be formed in the presence of oil and the material of the plug becomes harder and more resistant due to the effect of the formation heat.

It is another object to provide a method of sealing off porous formations in oil wells, wherein the material forming the initial plug changes due to the formation heat to a more infusible, less soluble, and less disintegratable material during the life of the well.

The process according to the invention comprises introducing into the desired formations a solution of acaroid resin dissolved in a water-miscible solvent, and leaching out or diluting the solvent with water or brine or other suitable fluid until a plug of acaroid resin is formed within the pores of the formation. It has been found that acaroid resin is highly advantageous for shutting off water in oil wells, since, contrary to the behavior of other natural resins and gums, it is converted by exposure to heat to an infusible and highly resistant material, which is insoluble in both oil and water, whereas other natural resins become more plastic and are flowed by formation pressures when exposed to the heat within deep earth formations. This material is additionally desirable for the present purpose since it is readily dissolved in relatively inexpensive solvents to form plug-forming solutions of low viscosity and high resin content.

The preferred water-miscible solvents are low molecular weight, straight chain aliphatic alcohols, such as methyl, ethyl propyl, and amyl alcohols, since solutions of acaroid resin in these solvents have low viscosities. On the other hand, solutions of acaroid resin in branched alcohols such as isopropyl and sec.-butyl alcohols, have considerably higher viscosities. The lower viscosities with the straight chain solvents facilitate the injections of the solution of acaroid resin into the formation, i. e., lower injection pressures are required.

Acaroid resin is variously known as yacca gum or grass tree gum and occurs in two varieties, namely, red and yellow, the main distinction being the presence of cinnamic acid in the latter kind. The red and yellow acaroid resins are products of various species of Xanthorrhea, especially X. australis, plants. In a typical anaysis, the red resin was found to contain 1% of free p-coumaric acid, 2% of this acid as an ester of erythro-resinotannol, traces of benzoic acid also in combination, and traces of p-hydroxybenzaldehyde, while 85% of the resin consists of the p-coumaric acid ester and the resin alcohol. The yellow resin contains about 4% of free p-coumaric acid, a small quantity of free cinnamic acid, and in principal amounts esters of these acids with xantho-resinotannol.

In preparing the treating solution of acaroid resin, it is preferable to dissolve the resin in a low molecular weight, straight chain alcohol, such as methyl alcohol, and filter the solution to remove the small percentage of alcohol-insoluble material. Solutions containing 50 to 80% of acaroid resin, more or less, have been found suitable, depending upon the nature, i. e., the permeability of the formation to be treated. The preferred resin solution is one containing a high concentration of resin (65-75% resin) with a reasonably low viscosity, i. e., one that can be forced into the formation under moderate pump pressure.

In carrying out the method of the present invention, a preferred procedure is as follows: The filtered treating solution consisting of, for example, 65% acaroid resin and 35% methyl alcohol, is introduced into the well and forced into the desired formation after bailing the well free of standing water. The injection of gum solution is preferably followed by at least 20% of its volume of an aqueous liquid, such as water or brine, and preferably by 25% or more of its volume. After a standing period, preferably 24 hours at least, to allow diffusion to take place, the well is produced slowly. A small flow of brine or water, which has been introduced or occurs naturally, through the treated formation leaches the alcohol from the resin solution, causing formation of a hard plugging deposit. After all or most of the alcohol has been leached out, the well is produced in the normal manner. The standing period may be omitted, if desired, and the alcohol may be leached out immediately to form a plugging deposit. On continued standing at the formation temperature, the acaroid resin plug is slowly converted into an infusible, insoluble, and resisitant solid. Since the resin solution forms a plug insoluble in both water and oil, it is advisable to direct the flow of the treating solution only into the formation to be sealed by means of packers or other suitable means.

As illustrative of the present invention, the following experiments are given, wherein a treating solution consisting of 65% acaroid resin and 35% methyl alcohol was injected into watered-out well cores containing residual oil. The treating solution was followed by 25% of its volume of oil field brine, and then the direction of flow of brine was reversed to leach out the alcohol. The experiments were carried out at 125° F. for a test period of 30 days.

In experiment 1, the direction of flow of brine was reversed immediately. The initial shut-off value was found to be 89.3% under a pressure gradient of 610 lbs. per square inch per foot and the shut-off increased rapidly. After a flow period of 27 hours, the shut-off was found to be 99.1% under a pressure gradient of 1035 lbs. per square inch per foot, and, at the end of the 30-day test period, it was found to be 99.8% under the same pressure gradient.

In experiment 2, the direction of the flow of brine, i. e., the well was allowed to flow, after a standing period of 24 hours during which diffusion of the brine into the treating solution was allowed to take place. The initial shut-off value was found to be 95.5% under a pressure gradient of 860 lbs. per square inch per foot and the shut-off increased to 99.1% under a pressure gradient of 1510 lbs. per square inch per foot after a flow period of 18 hours. At the end of the 30-day test period, the shut-off was found to be 99.8% under the latter pressure gradient. In comparing the two experiments, it may be seen that the initial shut-off is higher when diffusion is permitted before flowing the well.

These tests illustrate that by means of the acaroid resin solutions of the present invention, the flow of water under high pressure gradients, even through watered-out formations containing residual oil, is shut-off to a highly desirable extent and that the plugs formed are highly resistant to erosion by the flow of water or brine for long periods and are substantially permanent.

I claim as my invention:

1. The method of sealing off porous formations in oil wells comprising the steps of introducing into the well and injecting into the formation a treating solution of acaroid resin in a water miscible solvent, flowing the well to allow the solvent to be leached out of the treating solution, and allowing the resin deposited thereby to be converted by the action of the formation temperature to a water- and oil-insoluble plugging material.

2. The method of solidifying porous formations at elevated temperatures prevailing in deep wells, comprising the steps of introducing into the well and injecting into the formation a treating solution of acaroid resin in a water-miscible solvent, allowing formation fluids to leach the solvent out of the treating solution, and allowing the resin deposited thereby to be hardened by the action of the elevated formation temperature to a water- and oil-insoluble plugging material.

3. The method of solidifying porous formations at elevated temperatures prevailing in deep oil wells, comprising the steps of introducing into the well and injecting into the formation a treating solution of acaroid resin in a water-miscible solvent, following said treating solution with at least 20% of its volume of an aqueous liquid, flowing the well to allow the solvent to be leached out of the treating solution, and allowing the resin deposited thereby to be converted by the action of the elevated formation temperatures to a water- and oil-insoluble plugging material which does not soften or melt at these temperatures.

4. The method of solidifying a relatively high-temperature porous formation, comprising the steps of injecting into said formation a treating solution of acaroid resin in a low molecular weight, straight-chain aliphatic alcohol, following said treating solution with at least 20% of its volume of an aqueous solution, causing the alcohol to be leached out of the treating solution within said porous formation, and allowing the resin deposited thereby to be converted by the action of the elevated formation temperature to a non-melting water- and oil-insoluble plugging material.

5. The method of solidifying porous formations at elevated temperatures prevailing in deep oil wells, comprising the steps of introducing into the well and injecting into the formation a treating solution consisting of 50% to 80% acaroid resin in a low molecular weight, straight-chain aliphatic alcohol, following said treating solution with at least 20% of its volume of an aqueous liquid, flowing the well to allow the alcohol to be leached out of the treating solution, and allowing the resin deposited thereby to be hardened by the action of the formation temperature to a water- and oil-insoluble plugging material.

6. The method of solidifying porous formations at elevated temperatures prevailing in deep oil wells, comprising the steps of introducing into the well and injecting into the formation a treating solution of acaroid resin in a low molecular weight, straight-chain aliphatic alcohol, following said treatment with at least 20% of its volume of an aqueous liquid, allowing the well to stand for a period of at least 24 hours to permit diffusion of the aqueous liquid into the treating solution to take place, flowing the well to allow the alcohol to be leached out of the treating solution, and allowing the resin deposited thereby to be converted by the action of the elevated formation temperature to a water- and oil-insoluble plugging material which does not soften or melt at these subterraneal temperatures.

HOWARD C. LAWTON.